(12) United States Patent
Ivarsson et al.

(10) Patent No.: US 11,524,522 B2
(45) Date of Patent: Dec. 13, 2022

(54) WHEEL LOCKING DEVICE (71) Applicant: Rimgard Sweden AB, Solna (SE)

(72) Inventors: Lars Ivarsson, Stockholm (SE); Marcus Ekström, Hägersten (SE)

(73) Assignee: Rimgard Sweden AB, Solna (SE)

(*) Notice: Subject to any disclaimer, the term of this patent is extended or adjusted under 35 U.S.C. 154(b) by 491 days.

(21) Appl. No.: 16/701,236

(22) Filed: Dec. 3, 2019

(65) Prior Publication Data
US 2021/0162802 A1    Jun. 3, 2021

(51) Int. Cl.
*B60B 3/16*     (2006.01)
*B60R 25/00*    (2013.01)
(Continued)

(52) U.S. Cl.
CPC ............ *B60B 3/165* (2013.01); *B60B 7/16* (2013.01); *B60R 25/00* (2013.01); *E05B 81/06* (2013.01); *B60B 2900/3318* (2013.01)

(58) Field of Classification Search
CPC .......... E05B 73/00; E05B 77/44; E05B 81/00; E05B 81/02; E05B 81/04; E05B 81/06;
(Continued)

(56) References Cited

U.S. PATENT DOCUMENTS 2,012,735 A * 8/1935 Swartz ................ B60B 7/16
                                                70/156
2,124,035 A * 7/1938 Hurd ................. B60B 23/06
                                                292/6

(Continued)

FOREIGN PATENT DOCUMENTS

CN        2803830 Y     8/2006
CN      104228453 A    12/2014
(Continued)

OTHER PUBLICATIONS

International Search Report and Written Opinion dated Mar. 4, 2021, from International Application No. PCT/US2020/062923, 14 pages.
(Continued)

*Primary Examiner* — Christopher J Boswell
(74) *Attorney, Agent, or Firm* — Meunier Carlin & Curfman LLC (57) ABSTRACT

A device for locking the wheel of a vehicle. The device comprises a main module adapted to be attached to the wheel and configured to cover nuts or bolts for attaching the wheel to the vehicle. The device further comprises an insert structure comprising a first part and a second part wherein the first part engages the second part and wherein the insert structure is transferable from a first position to a second position upon compression of a spring. Moreover, the insert structure in said second position is adapted for insertion in the wheel concentrically to the axis of rotation of the wheel and the insert structure in said first position is adapted for fixating the insert structure in said wheel upon transfer to the first position after insertion in the wheel. The device further comprises a center bolt adapted to be connected through the main module to the second part of the insert structure by means of a threading as well as a locking mechanism adapted to be arranged in a locking state in which the locking mechanism prevents the center bolt from rotating relative the main module, and in an open state in which the locking mechanism allows the center bolt to rotate relative the main module.

15 Claims, 6 Drawing Sheets

(51) Int. Cl.
B60B 7/16 (2006.01)
E05B 81/06 (2014.01)

(58) Field of Classification Search
CPC ......... B60B 3/165; B60R 25/00; B60R 25/09; B60R 25/093
See application file for complete search history.

(56) References Cited

U.S. PATENT DOCUMENTS

| | | | | |
|---|---|---|---|---|
| 2,217,775 | A * | 10/1940 | Smith | B60B 7/16 70/168 |
| 2,363,567 | A * | 11/1944 | Blakeman | E05B 65/006 292/6 |
| 2,568,370 | A * | 9/1951 | Scuderi | B60B 3/18 301/35.52 |
| 2,807,157 | A * | 9/1957 | McLin | B60B 7/16 292/6 |
| 3,833,266 | A | 9/1974 | Lamme | |
| 3,995,461 | A * | 12/1976 | Hudson | B60B 7/16 70/225 |
| 4,825,669 | A * | 5/1989 | Herrera | B60B 7/16 70/232 |
| 8,739,585 | B2 | 6/2014 | Sims | |
| 8,943,865 | B1 | 2/2015 | Bullock et al. | |
| 9,120,446 | B2 * | 9/2015 | Thomas | B60R 25/00 |
| 9,689,180 | B2 | 6/2017 | Ivarsson | |
| 10,486,461 | B1 | 11/2019 | Ivarsson et al. | |
| 2004/0112101 | A1 * | 6/2004 | Labuschagne | B62B 5/0423 70/225 |
| 2017/0232786 | A1 | 8/2017 | Hickey et al. | |
| 2018/0065408 | A1 * | 3/2018 | Wang | B60B 7/04 |
| 2018/0126778 | A1 | 5/2018 | Fisher | |
| 2019/0344619 | A1 | 11/2019 | Price | |

FOREIGN PATENT DOCUMENTS

| | | |
|---|---|---|
| CN | 106626965 A | 5/2017 |
| DE | 3233918 A1 | 3/1984 |

OTHER PUBLICATIONS

Search report of Swedish patent application No. 1951376-1, dated May 26, 2020, 2 pages.
Search report of Swedish patent application No. 1951377-9, dated May 26, 2020, 2 pages.

* cited by examiner

WHEEL LOCKING DEVICE

TECHNICAL FIELD

The present inventive concept relates to a technology for preventing unauthorized removal of vehicle wheels. More specifically, the present inventive concept relates to a universal comprehensive locking system for car wheels is disclosed.

BACKGROUND

Unauthorized removal of car parts, specifically alloy wheels, is a frequently occurring problem all over the world. Due to their high value, custom wheels and tire rims are examples of items frequently stolen. Accordingly, there is a great need for devices and techniques for protecting wheels from unauthorized removal.

There have been attempts to provide such protection. For example, U.S. Pat. Nos. 8,739,585 and 8,943,865 disclose antitheft devices for car wheels. These devices can be removed relatively easily by an experienced thief and thus do not provide a truly reliable wheel lock. U.S. Pat. No. 9,689,180 issued to the inventor of this application provides a device that provides secure wheel lock. However, considering the great variety of car makes and models all over the world, there is a need for an improved wheel lock system that fits, without substantial adjustments, to most car wheels.

SUMMARY

In view of the above, an object of the present inventive concept is to provide a technology that addresses at least some of the above concerns. This and other objects, which will become apparent in the following, are accomplished by a device as defined in the independent claim. Preferable embodiments are defined in the dependent claims.

Hence, according to a first aspect of the present inventive concept, there is provided a device for locking the wheel of a vehicle. The device comprises a main module adapted to be attached to the wheel and configured to cover nuts or bolts for attaching the wheel to the vehicle. The device further comprises an insert structure comprising a first part and a second part wherein the first part engages the second part and wherein the insert structure is transferable from a first position to a second position upon compression of a spring. Moreover, the insert structure in said second position is adapted for insertion in the wheel concentrically to the axis of rotation of the wheel and the insert structure in said first position is adapted for fixating the insert structure in said wheel upon transfer to the first position after insertion in the wheel. The device further comprises a center bolt adapted to be connected through the main module to the second part of the insert structure by means of a threading as well as a locking mechanism adapted to be arranged in a locking state in which the locking mechanism prevents the center bolt from rotating relative the main module, and in an open state in which the locking mechanism allows the center bolt to rotate relative the main module.

The main module may comprise protective elements or blocking means adapted to restrict, limit or block access to the bolt heads and/or lug nuts, thereby hindering or at least making it harder for an unauthorized person to undo the bolts/lug nuts and remove the wheel. The protective elements may form an integral part of the main module, or be attached as separate items to the same, and may preferably be arranged in a pattern corresponding to the position of the bolts/nuts of the wheel.

The insert structure may be operated in a first position and in a second position and may be transferable from a first position to a second position and vice versa. The second position may be achieved by applying opposite forces on the first part and on the second part of the insert structure permitting the compression of the spring positioned between said first part and second part. The application of opposing forces results in a translation movement of the first part towards the second part. Consequently, the first position may be achieved by releasing said applied opposing forces resulting in a translation movement of the first part away from the second part due to the resilient force of the spring decompression. By "translation movement" it is here meant a linear movement of at least one of the upper and second part of the insert structure relative to the other one of the upper and second part, in a direction perpendicular to the axis of rotation of the wheel of the vehicle on which the device is installed. The insert structure is arranged to secure the device to the wheel, this may be achieved by inserting the insert structure in the wheel hub whilst in a second position to further securely fix the insert structure in the wheel hub by transferring it to the first position. Moreover, in the first position the insert structure exerts a force on the inner walls of the wheel hub, preventing it from releasing from the wheel even when sustaining significant force in the axial direction of the wheel. By the term "wheel hub" it is here meant a cylindrical hallow central portion of a vehicle wheel concentric to the axis of rotation of said wheel. By the term "inner walls of the wheel hub" it is here meant the inner surface(s) of the wheel hub. Furthermore, the insert structure may be of, but not limited to, a circular or round shape allowing it to be more adaptable to vehicle wheel hubs. The spring being positioned between the upper and second part of the insert structure may be represented by, but not limited to, a leaf spring and may provide sufficient resilient force such that the first part and the second part of the insert structure are normally kept in the first position. The spring may also provide adequate resilient force such that the transfer from the first position to the second position may be achieved by human force, in other words, the spring may be compressed by opposing forces applied manually without requiring any specific instrumentation. By "leaf spring" it is here meant a spring having a slender arc-shaped length providing resilience to linear compression perpendicular to its arc-shaped length. The insert structure is further advantageous in that it allows the device to be installed on the wheel of a vehicle without requiring the removal of said wheel from the vehicle for the installation, thus resulting in an improvement of the user utilization. In addition, by having the first part engaged in the second part, the insert structure further reduces to only the insert structure the number of components required to fix the device to the wheel of the vehicle which in turn results in a reduction of the complexity of the device.

The center bolt comprised in the device may be threaded directly in its material and joined to the insert structure via a corresponding thread directly threaded in the material of the second part of the insert structure. The thickness of the second part of the insert structure may be similar or larger than the thickness of the first part thus comprising more material resulting in an efficient thread distance or thread length as well as a stronger and more secure thread. The strength of the aforementioned thread may also result in a stronger connection with the corresponding thread of the center bolt thus permitting an increase of the strength of fixation of the device to the wheel of the vehicle. The corresponding threads may be oriented such that the center bolt, upon rotation, moves along the axis of rotation of the wheel. The rotation may for example be achieved by means of a key or a wrench fitting with the center bolt or by means of human force. When the main module has been installed and secured, for example by tightening the center bolt as described above, the locking mechanism may be brought into its locking state to prevent an unauthorized entity from removing the locking means and thereby accessing the nuts/bolts of the wheel. The locking mechanism may be configured to prevent the center bolt from being turned or rotated in the main module. This may be achieved in a number of ways, some of which being discussed in further detail in connection with the detailed description of the drawings. In one example, the locking mechanism may comprise a locking bolt that can be fixed to the center bolt and to the main module to prevent rotational movement between the two. The locking bolt of the locking mechanism may for example have a flat side that engages with a corresponding surface in the center bolt and the main module to keep the locking bolt from rotating. The locking mechanism may, in the locking state, be axially secured to for example the wheel by means of a washer configured to engage with a backside of the main module or by engagement of corresponding recesses and protrusions between the locking bolt and the center bolt. To bring the locking mechanism in the open state, the washer or corresponding recesses and protrusions may be rotated such that it/they can be released from engagement with the main module or center bolt and the locking bolt removed from the center bolt.

The locking mechanism may in some examples be a key operated lock, such as e.g. the Assa Desmo+ or Abloy camlock.

According to an embodiment, the first part of the insert structure may comprise an inferior surface and the second part of the insert structure may comprise a superior surface arranged such that the inferior surface is in constant contact with the superior surface. Thus, the inferior surface and the superior surface may be in constant contact even during transfer from the first to the second position. The present embodiment is advantageous in that the constant contact prevents any translation movement of the first part relative to the second part other than the translation movement of the first part towards the second part required to transfer the insert structure from a first position to a second position and the analogous translation movement of the first part away from the second part required to transfer from the second position to the first position. Furthermore, the aforementioned constant contact of the inferior surface on the superior surface allows for both the first part and the second part to be in a plane perpendicular to the axis of rotation of the wheel of the vehicle.

According to an embodiment, the first part and the second part of the insert structure may comprise a first through hole and a second through hole respectively and the first and second through holes are adapted to receive the center bolt. Thus, the first part comprises the first through hole whereas the second part comprises the second through hole.

As an example, the first part may form a first ring-shaped structure arranged in the first plane and around the first through hole, whereas the second part may form a second ring-shaped structure arranged in the second plane and around the second through hole.

The first and second through holes may be concentric when the insert structure is in the first position. Said through holes may also be concentric with the axis of rotation of the wheel when the insert structure is in the first position and securely inserted in said wheel. Moreover, the inferior surface of the first part of the insert structure and the superior surface of the second part of the insert structure may define the circumference of the first and second through holes respectively. The present embodiment is further advantageous in that, in the first position, the first through hole allows the center bolt to pass therethrough and to be secured to the thread formed in the material of the inner surface of the second through hole located on the second part of the insert structure. Furthermore, the present embodiment is advantageous in that receiving the center bolt through the first and second through hole allows for any movement or lateral translation of the first part relative to the second part to be completely restricted thus resulting in a secure fixation of the device to the wheel of the vehicle.

According to an embodiment, the second part of the insert structure may comprise a first guard and the first part of the insert structure may comprise a second guard such that the first guard at least partially surrounds the first part and the second guard at least partially surrounds the second part when the insert structure is in the second position. The first and second guards may thus be rims extending form the surface of the second and first part, respectively. As an example, the first guard may form a rim extending from the superior surface of the second part whereas the second guard may form a rim extending from the inferior surface of the first part. The present embodiment is advantageous in that the first and second guards surrounding the upper and second parts of the insert structure restrict said first part and said second part from any rotational movement relative to one another and about the axis of rotation of the wheel in which the insert structure is inserted. In other words, the first part of the insert structure is restricted from rotating about the axis of rotation of the wheel by the first guard and the second part of the insert structure is restricted from rotating about the axis of rotation of the wheel by the second guard. Furthermore, the first guard and the second guard act as delimiters of the translation movement of the first part of the insert structure relative to the second part when transferring from a first position to a second position. The first and second guards will abut one another when the insert structure reaches the second position. The present embodiment is further advantageous in that the first guard permits the containment and therefore the compression of the spring positioned such that it exerts a force on the first guard and on the outer circumference of the first part of the insert structure. The positioning of the spring will be described further in relation to the provided figures.

According to an embodiment, the first guard may comprise a central protrusion forming a channel with a superior surface of the second part of the insert structure wherein the first part of the insert structure may completely engage the channel when in the second position and may partially engage the channel when in the first position. The central protrusion of the first guard is oriented towards the center of the insert structure such that the formed channel has a dimension similar to the thickness of the first part of said insert structure defined between the inferior surface and the superior surface of the first part. The dimension of the channel therefore allows the first part of the insert structure to completely engage said channel when the insert structure is transferred to second position. In addition, as the channel is formed along the first guard which at least partially surrounds the first part, said first part thus always at least partially engages said channel. The present embodiment is further advantageous in that it restricts completely the translation movement of the first part of the insert structure relative to the second part in the direction of the axis of rotation of the wheel in which said insert structure is fixed in turn ensuring constant contact between the inferior surface of the first part and the superior surface of the second part of the insert structure.

According to an embodiment, the spring may be arranged to be positioned in the channel and exert opposing forces on the second part and on the first part such that the insert structure is normally in the first position. As previously mentioned, the spring may represent a leaf spring but may also represent any spring-loaded component providing sufficient resilient force such that the first part and the second part of the insert structure are normally kept in the first position. The present embodiment is advantageous in that the channel formed by the central protrusion of the first guard and the superior surface of the second part of the insert structure allows the protection of the spring by at least partially covering it as well as preventing its translation movement in the direction of the axis of rotation of the wheel in which the insert structure is fixated. This restriction of movement allows the forces exerted by the spring to remain perpendicular to the first guard of the second part and to the outer circumference of the first part on which they are applied thus decreasing wear of the insert structure. In other words, the perpendicularity of the applied forces increases the longevity of the insert structure in terms of number of transitions between first position and second position.

According to an embodiment, the spring may represent a leaf spring comprising an arc-shaped length and at least two legs wherein the arc-shaped length may be arranged to abut the first guard of the second part and the at least two legs may be arranged to abut the first part. The present embodiment is advantageous in that the at least two legs allow efficiently distanced points of contact between the leaf spring and the first part resulting in the prevention of rotational movement of the leaf spring in the channel about the axis of rotation of the wheel of the vehicle within which the insert structure may be inserted.

According to an embodiment, the insert structure may comprise a stopper inserted through the second part and the first part of the insert structure and configured to limit the movement of the first part relative to the second part such that the first and second through holes may be concentric when the insert structure is in the first position. The present embodiment is therefore advantageous in that, in the first position, the insert structure allows the first and second through holes to be concentric together as well as concentric with the axis of rotation of the wheel on which the present device is installed. By being inserted through the second part and first part of the insert structure, the stopper further restricts said first part and said second part from any rotational movement relative to one another and about the axis of rotation of the wheel in which the insert structure is inserted.

According to an embodiment, the first part of the insert structure and the second part of the insert structure may comprise a first wedge and a second wedge respectively. The present embodiment is advantageous in that the first and second wedges represent the components allowing the insert structure to be securely fixed within the wheel hub of the vehicle. According to another embodiment, the first wedge and the second wedge may be arranged on opposite sides of the diameters of the first through hole and the second through hole of the upper and second parts of the insert structure.

According to an embodiment, the first wedge and the second wedge may determine an outer diameter of the insert structure wherein said outer diameter may decrease when the insert structure transfers to the second position. The present embodiment is advantageous in that the compression of the spring resulting in the translation of the first part of the insert structure relative to the second part of the insert structure towards the first guard consequently allows the first wedge to move similarly thus reducing the outer diameter. The reduction of the outer diameter further allows the insert structure to reach a dimension smaller than the dimension of the diameter of the wheel hub rendering possible and uncomplicated the insertion therein of the insert structure. It will be appreciated that the outer diameter determined by the first and second wedges reaches a maximum when the insert structure is in the first position and a minimum when the insert structure is in the second position and the stopper abuts a limiting recess comprised in the first part and which will be described further in conjunction with the provided figures.

According to an embodiment, opposing forces may be applied to the first part and to the second part towards the center of the insert structure to transfer from the first position to the second position and released to transfer from the second position to the first position. In other words, the insert structure is transferable from the first position to the second position upon application of opposing forces on the first and second part directed towards one another and towards the center of the insert structure. The opposing forces may be stronger than the resilience of the leaf spring exerting a force on the first and second part of the insert structure. Consequently, the insert structure is transferable from the second position to the first position upon release of said opposing forces. As previously mentioned, it will be appreciated that the opposing forces may be applied manually by human force therefore requiring no further instrumentation.

According to an embodiment, the first part of the insert structure may be configured to translate towards the second part of the insert structure in a direction parallel to a plane formed by the contacting inferior surface and superior surface when transferring from the first position to the second position and to translate away from the second part of the insert structure in a direction parallel to a plane formed by the contacting inferior surface and superior surface when transferring from the second position to the first position. The present embodiment is advantageous in that the opposing forces applied to the first and second part of the insert structure result in the compression of the leaf spring and in the translation movement of the first part relative to the second part in a direction parallel to the plane formed by the surfaces of the first and second part i.e. a plane perpendicular to the axis of rotation of the wheel within which the insert structure may be inserted. Oppositely, transferring from the second position to the first position, i.e. when releasing the opposing forces and upon decompression of the spring, results in the translation movement of the first part relative to the second part also in a direction parallel to the plane formed by the surfaces of the first and second part of the insert structure but opposite to the translation movement achieved when transferring from the first position to the second position.

According to an embodiment, the first wedge and the second wedge of may be configured to secure the insert structure by engaging the wheel of the vehicle when the insert structure is in the first position and to release the wheel of the vehicle when the insert structure is in the second position. As mentioned above, the outer diameter of the insert structure determined by the first and second wedges reaches its largest dimension when the insert structure is inserted in the wheel and transferred to the first position allowing said outer diameter to be larger than the dimension of the wheel hub entry through which the insert structure was inserted. The present embodiment is therefore advantageous in that it permits the surfaces of the first and second wedges to exert a force on the inner walls of the wheel hub resulting in a secure fixation of the device in the wheel of the vehicle and increased resistance against forces applied in the axial direction of said wheel. In other words, the force exerted by the first and second wedge on the inner walls of the wheel hub prevents the device from being released from the wheel due to a pulling or pushing force applied on said device when the insert structure is in the first position. Alternatively, the outer diameter of the insert structure may be reduced by transferring the insert structure to the second position therefore allowing said outer diameter to reach a dimension smaller than the dimension of the wheel hub entry through which the insert structure was inserted permitting it to be released from the wheel of the vehicle. The present embodiment is further advantageous in that the translation of the first part of the insert structure relative to the second part towards the first guard permits at least one of the first and second wedges to cease the exertion of a force on the inner walls of the wheel hub resulting in the release and possible extraction of the insert structure from the wheel of the vehicle.

According to an embodiment, the locking mechanism may comprise a locking protrusion formed in the center bolt, an insert sleeve having a third through hole and being adapted to be rotationally secured to the main module and a detachable locking bolt adapted to be inserted into the main module via the third through hole and the locking protrusion. The locking protrusion and the third though hole may further be configured to be aligned with each other and the locking bolt may be adapted to prevent the center bolt from rotating relative the insert structure. The insert sleeve may comprise recesses and protrusions configured to engage with corresponding recesses and protrusions of the main module. The device may further comprise a locking cap adapted to be rotationally secured to the main module. The locking cap may comprise a fourth through hole adapted to receive a locking bolt, and recesses and protrusions configured to engage with corresponding recesses and protrusions of the insert sleeve. The present embodiments permit the reduction of undesired rotational movement of the center bolt which may lead to the release of the device from the wheel of the vehicle.

According to an embodiment, the detachable locking bolt may comprise a key hole and may be operable by turning a key in the lock and wherein the detachable locking bolt may be configured to be inserted via a front side of the device and secured in the axial direction by engaging the locking protrusion of the center bolt. The present embodiment is advantageous in that it allows for simplicity of use of the device by a user requiring no tooling or assembly instruments other than an assigned key.

BRIEF DESCRIPTION OF THE DRAWINGS

The above, as well as additional objects, features and advantages of the present invention, will be better understood through the following illustrative and non-limiting detailed description of embodiments of the present invention. Reference will be made to the appended drawings, on which.

DETAILED DESCRIPTION OF EMBODIMENTS

Figure 1:
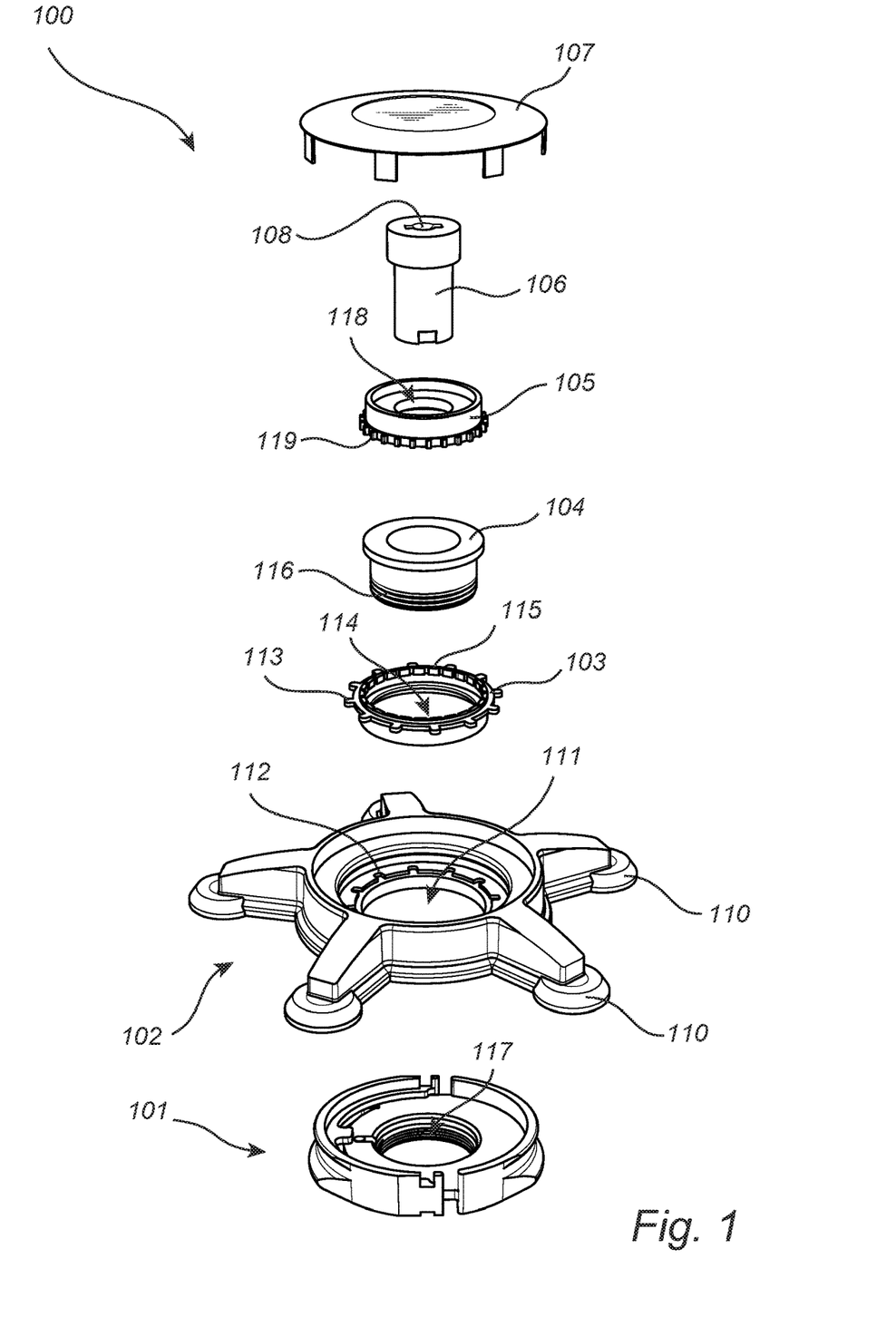
FIG. 1, illustrates an exploded view of a device for locking the wheel of a vehicle comprising all components according to an embodiment.

FIG. 1 illustrates an exploded view of a device 100 for locking the wheel of a vehicle according to an embodiment of the present invention, comprising an insert structure 101 shown in a first position, a main module 102, an insert sleeve 103, a center bolt 104, a locking cap 105, a detachable locking bolt 106 and a protective cover 107. The device 100 according to the present invention is arranged to be installed on the wheel of a vehicle starting by the insertion of the insert structure 101 within the wheel hub of the wheel to be protected by the device 100. The insert structure 101 may be inserted into the wheel hub in a second position to further be securely fixed in said wheel hub by being transferred to a first position. Further details regarding the insert structure 101 will be described in the subsequent figures. FIG. 1 further shows a main module 102 having a plurality of protective elements 110 adapted to restrict, limit or block access to the bolt heads and/or lug nuts of the wheel of the vehicle being protected by the device 100. The protective elements 110 are shown in FIG. 1 as an integral part of the main module 102 and forming a pattern corresponding to the of the position of the bolts/nuts on the wheel. The main module 102 further comprises an opening 111 in its center allowing components to be joined to the insert structure 101 through the main module 102 thus securing the device 100 to the wheel of the vehicle. The main module 102 shown in FIG. 1 further comprises a recess pattern 112 on the circumference of its opening 111 arranged to be engaged by a corresponding outward protrusion pattern 113 comprised on the circumference of the insert sleeve 103. The insert sleeve 103 shown in FIG. 1 further comprises the third through hole 114, as described in a previous embodiment, as well as a recess pattern 115 on the circumference of said third through hole 114. The insert sleeve 103 is meant to engage the main module 102 in its opening 111 and in turn receive the center bolt 104. The center bolt 104 as shown in FIG. 1 comprises a cylindrical body with a hollow center and a bottom threading 116 formed directly in the material of the outer wall of the inferior portion of the center bolt 104. It is to be noted that the center bolt 104 is not limited to having a hollow center and may also comprise a through hole. The center bolt 104 further comprises a locking protrusion on the inner wall of its hollow center (not shown in FIG. 1) adapted to engage and secure the locking mechanism. FIG. 1 further illustrates a locking cap 105 comprising a fourth through hole 118 adapted to receive the detachable locking bolt 106 and comprising an outward protrusion pattern 119 arranged to engage the corresponding recess pattern 115 of the insert sleeve 103. The detachable locking bolt 106 or lock shown in FIG. 1 may comprise a locking recess (not shown) and may be adapted to be inserted into the center bolt 104 and to engage the locking protrusion of said center bolt 104 when a key is rotated in the key hole 108 of the detachable locking bolt 106. FIG. 1 finally shows a protective cover 107 adapted to be attached to the main module 102 e.g. by snapping function and to cover the aforementioned components for further protection of the device 100, more specifically the key hole 108 and the detachable locking bolt 106. The device 100 shown in the exploded view of FIG. 1 may be installed on the wheel of a vehicle by initially inserting the insert structure 101 in the hub of the wheel. The installation further occurs by engaging, via the corresponding recesses and protrusions patterns 112, 113, the insert sleeve 103 in the main module 102. The center bolt 104 may then be inserted through the third through hole 114 and through the opening 111 of the main module 102 and rotatably secured by means of its bottom thread 116 to the corresponding thread 117 of the insert structure 101. The detachable locking bolt 106 may then be inserted in the center bolt 104 via the fourth through hole 118 of the locking cap 105 which in turn may be secured in to the insert sleeve 103 by engagement of the corresponding recesses and protrusions patterns 115, 119. When installed on the wheel of a vehicle, all components of the device 100 shown in FIG. 1 are aligned with the axis of rotation of the wheel thus rendering all openings and through holes concentric. The device 100 is therefore secured to the wheel of a vehicle by means of threading 116, 117, securing the center bolt 104 to the insert structure 101 which in turn secures the device 100 and its components to the wheel. When the detachable locking bolt 106 engages the locking recess of the center bolt 104 following turning a key in the key hole 108, the center bolt is restricted from any rotational movement which would release it from the insert structure 101. The un-installment of the device 100 may be done by removing the detachable locking bolt 106 and rotating the center bolt 104 out of the insert structure 101 therefore releasing the main module 102 and other components from the wheel of the vehicle.

Figure 2:
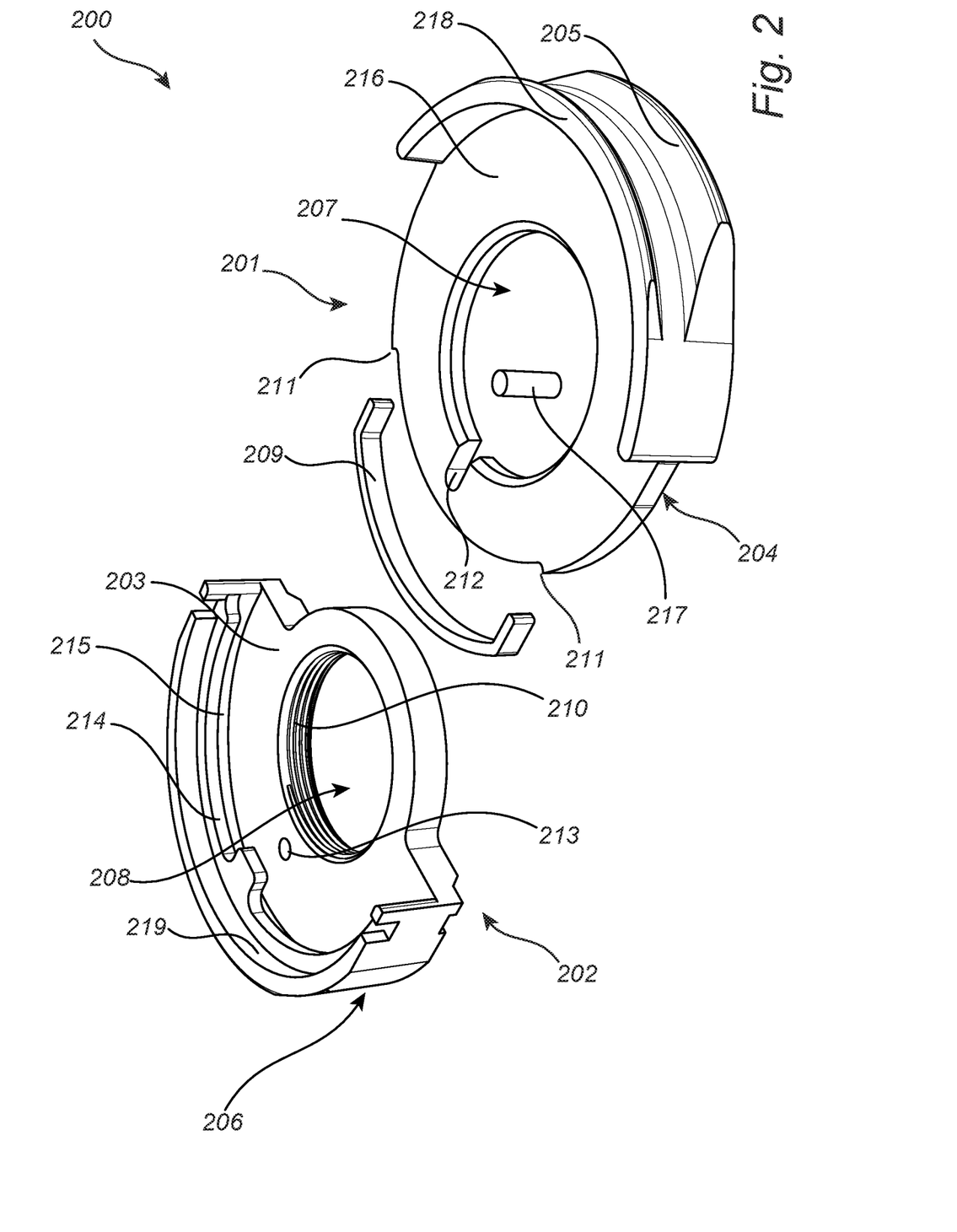
FIG. 2 illustrates an exploded view of the insert structure according to an embodiment.

FIG. 2 illustrates an exploded view of the insert structure 200 according to an embodiment of the present invention comprising the first part 201 and the second part 202. The first part 201 further comprises a first through hole 207 in which a limiting recess 212 is formed in the circumference of the first through hole 207 for receiving the stopper 217. The depth of the limiting recess 212 may be such that when the stopper 217 abuts the bottom of said limiting recess 212, the first through hole 207 is concentric with the second through hole 208 and the insert structure 200 once assembled is in the first position. The first part 201 shown in FIG. 2 further illustrates a second guard 218 arranged to at least partially surround the second part 202. The first part 201 further comprises an inferior surface 204 arranged to constantly be in contact with the superior surface 203 of the second part 202 as well as a first wedge 205 and a second wedge 206 configured to exert forces on the inner wall surfaces of the wheel hub when the insert structure 200 once assembled is fixed within said wheel hub and in the first position. FIG. 2 further depicts anchors 211 formed in the material of the first part 201 and positioned on its outer circumference facing the second part 202. The anchors 211 of the first part 201 shown in FIG. 2 are further adapted to receive and secure contact with the leaf spring 209 which abuts the anchors 211 therefore exerting sufficient forces on said anchors 211 such that the insert structure 200 remains normally in the first position once assembled. Furthermore, the second part 202 of the insert structure 200 shows a thread 210 formed in the material of the inner surface of the second through hole 208 which thread distance is defined by the thickness of the second part 202. FIG. 2 further shows a first guard 219 arranged to at least partially surround the first part 201 of the insert structure 200 once assembled in which a central protrusion 214 is positioned in its center and protrudes towards the first part 200 in a direction parallel to the superior surface 203. The central protrusion 214 shown in FIG. 2 further forms a channel 215 with the superior surface 203 such that the first part 201 of the insert structure 200, once assembled, engages the channel 215 partially when in the first position and fully when in the second position. During assembly of the insert structure 200 of FIG. 2, the leaf spring 209 is compressed in the channel 215 between the inner wall of the first guard 219 of the second part 202 and the anchors 211 of the first part 201. Once enclosed in the channel 215, the leaf spring 209 is restricted from movements in the direction of the axis of rotation of the wheel of the vehicle by the central protrusion 214 and from rotational movement about said axis of rotation by the anchors 211. The first part 201 further engages the second part 202 such that the first through hole 207 is concentric with the second through hole 208 and such that the inferior surface 204 of the first part 201 is in contact with the superior surface 203 of the second part 202 and the central protrusion 214 is in contact with the superior surface 216 of the first part. During assembly of the insert structure 200 shown in FIG. 2, the stopper 217 is inserted through the insertion hole 213 of the second part 202 and into the limiting recess 212 of the first part 201. Upon the resilient forces applied by the leaf spring 209 on the first part 201 and the second part 202, the stopper 217 abuts the bottom of the limiting recess 212.

Figure 3A:
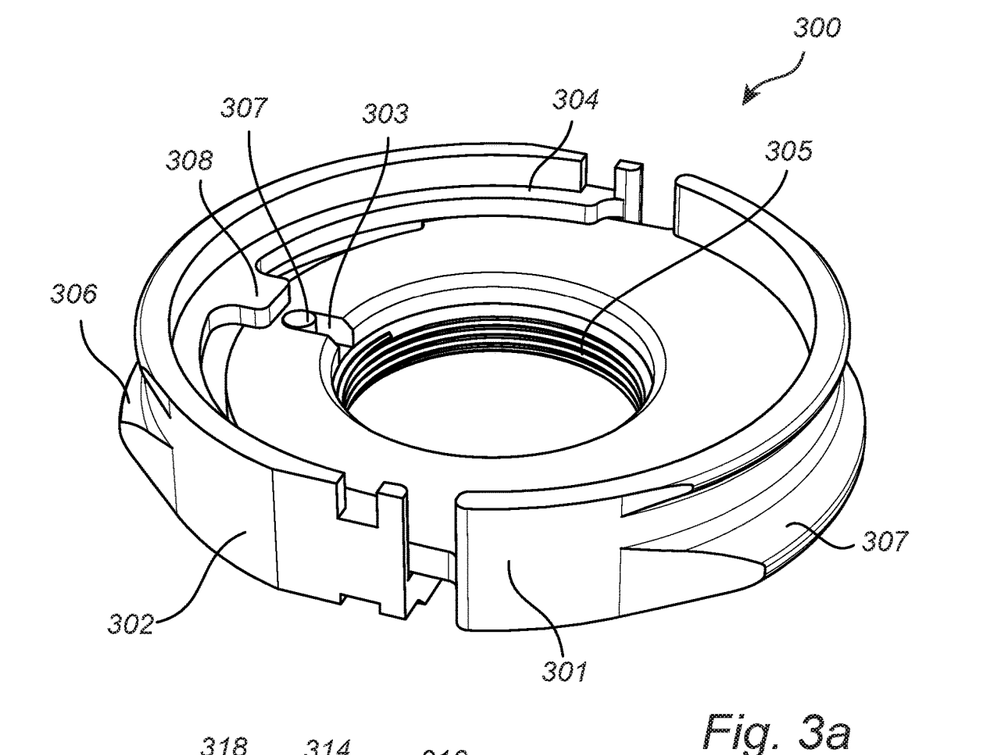
FIG. 3*a* illustrates a perspective view of the insert structure in a first position according to an embodiment.
Figure 3B:
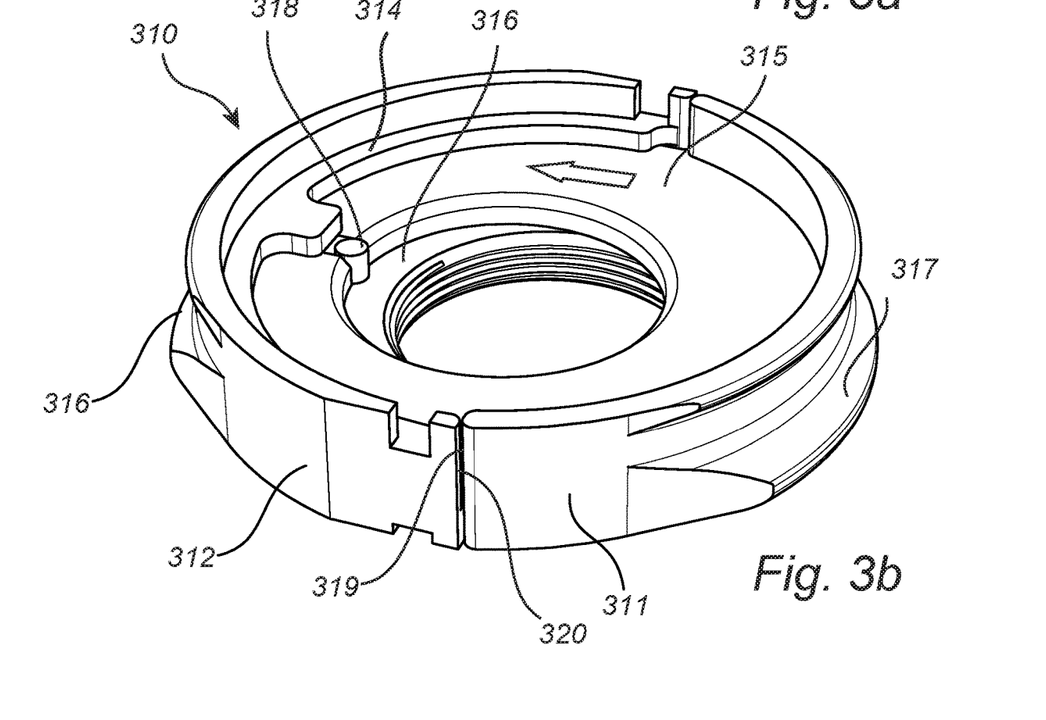
FIG. 3*b* illustrates a perspective view of the insert structure in a second position according to an embodiment.

FIGS. 3a and 3b illustrate a perspective view of the insert structure in a first position 300 and an insert structure in a second position 310 according to embodiments of the present invention. The insert structure 300 shown in FIG. 3a is shown in the first position wherein the spring (not visible in FIG. 3a but located between the first part 301 and the second part 302 in the channel formed by the central protrusion 304 and the superior surface of the second part 302 of the insert structure 300) exerts opposing forces on the second part 302 and on the first part 301 in a direction perpendicular to the axis of rotation of the wheel within which the insert structure 300 is inserted. The opposing forces applied by the spring are such that the stopper 307, inserted through the insertion hole of the second part 302 abuts the bottom of the limiting recess 303 of the first part 301. The depth of the limiting recess 303 shown in FIG. 3a may be of a dimension ensuring that the first through hole of the first part 301 and second through hole of the second part 302 are concentric when the stopper 307 abuts the bottom of said limiting recess 303. Furthermore, FIG. 3a shows a first wedge 307 comprised on the first part 301 of the insert structure 300 and a second wedge 306 comprised on the second part 302 of the insert structure 300. The first and second wedges 307, 306 form an integral part of the upper and second parts 301, 302 of the insert structure 300 and are positioned opposite to one another around the diameters of the first and second through holes. The insert structure 300 shown in the first position in FIG. 3a depicts the first part 301 at least partially engaging the channel formed by the central protrusion 304 and the superior surface of the second part of the insert structure 300. The central protrusion 304 is further shown comprising a flap 308 extending from the central protrusion 304 towards the stopper 307 in a direction parallel to the superior surface of the first part 301. The flap 308 is arranged to partially cover the section of the first part 301 which does not engage the channel of the second part 302 when the insert structure 300 is in the first position. The concentric first and second through holes shown in FIG. 3a permit the insert structure 300 to receive the center bolt by means of threading or the thread 305 with the corresponding thread of the center bolt while simultaneously exerting forces on the inner walls of the wheel hub by means of the first and second wedges 307, 306. Regarding FIG. 3b there is shown an insert structure 310 in the second position. FIG. 3b shows the first part 311 completely engaging the second part 312 as a result of opposite forces (not shown) being applied to said first part and second part 311, 312 such that the spring (not visible in FIG. 3b) is compressed in the channel formed by the central protrusion 314 and the superior surface 316 of the second part 312. FIG. 3b further shows the first and second through holes being non-concentric as a result of the translation movement of the first part 311 relative to the second part 312 when transferring from the first position to the second position. Furthermore, the edge surfaces 319, 320 of the second part 312 and first part 311 are shown in FIG. 3b abutting one another therefore limiting said translation movement of the first part 311 relative to the second part 311. The insert structure 310 shown in FIG. 3b illustrates the stopper 318 disengaged from the limiting recess of the first part 311.

Figure 4A:
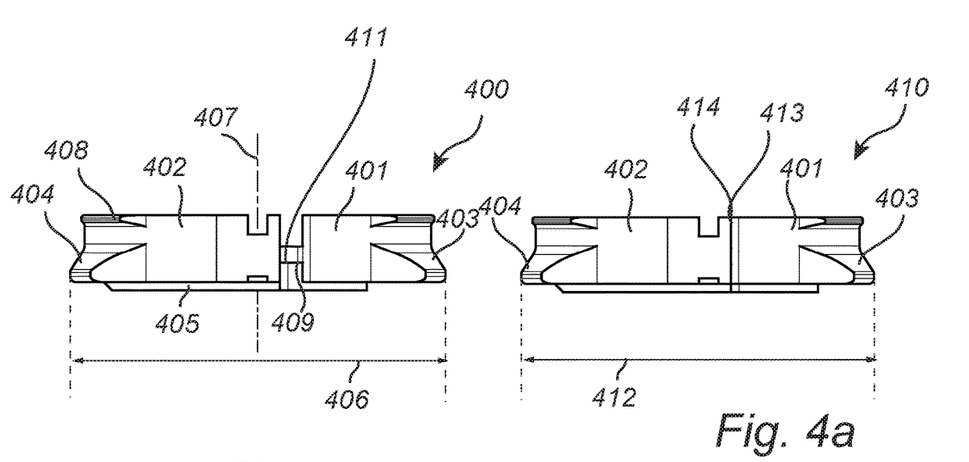
FIG. 4*a* illustrates a side view of the insert structure in both a first position and a second position according to an embodiment.
Figure 4B:
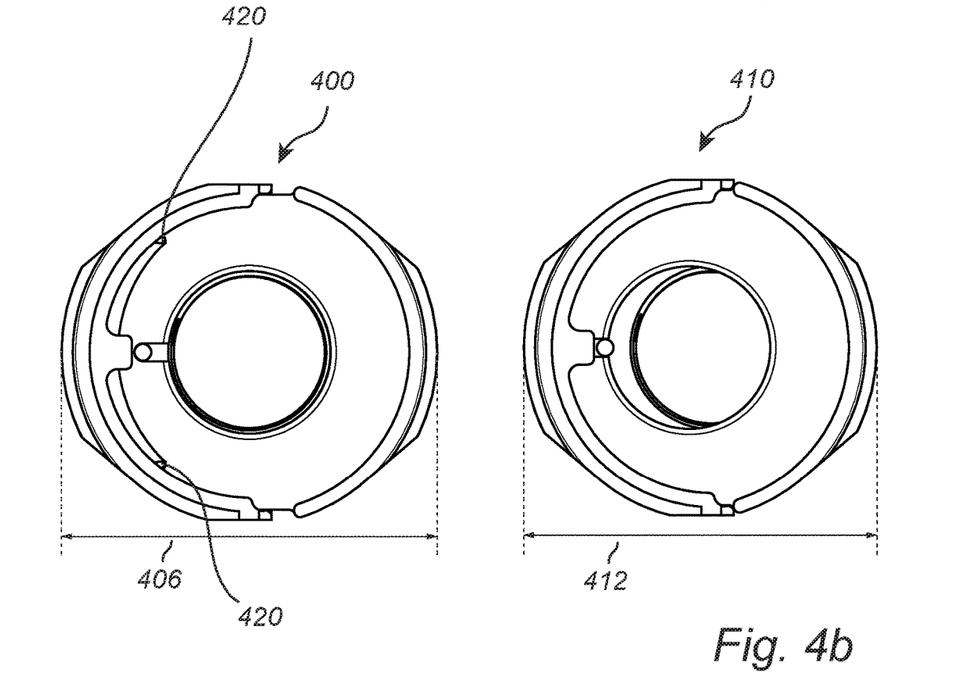
FIG. 4*b* illustrates a top view of the insert structure in both a first position and a second position according to an embodiment.

FIGS. 4a and 4b illustrate a side view and a top view of the insert structure in both a first and second position according to an embodiment of the present invention. With regards to FIG. 4a, there is shown a side view of an insert structure in a first position 400 comprising a first part 401 and a second part 402 and in which the constant contact between the inferior surface 411 of the first part and the superior surface 409 of the second part 402 is illustrated. FIG. 4a further shows the concentricity of the first and second through holes of the first part 401 and the second part 402 about the axis 407. When installed in the wheel of a vehicle, the concentric axis 407 may represents the axis of rotation of the wheel. The insert structure 400 depicted in FIG. 4a further shows the maximum outer diameter 406 determined by the extremities of the first and second wedges 403, 404 which is reached by the insert structure 400 in the first position. FIG. 4a further illustrates holding elements 408 built in the profile of the first part 402 and second part 401 adapted to hold the insert structure 400 in place in when inserted in the wheel hub. The thickness 405 of the second part 402 is also shown in FIG. 4a as extending below the bottom surface f the insert structure 400, 410. As previously mentioned, the difference in thickness between the first part 401 and the second part 402 is dependent on the thread distance required in the inner surface of the second through hole of the second part 402 in order to ensure a secure fixation of the center bolt in said second through hole. FIG. 4a further shows the insert structure 410 in a second position in which there is shown the edge surfaces 414 and 413 In contact as well as the reduced outer diameter 412 determined by the first and second wedges 403, 404 following the translation movement of the first part 401 relative to the second part 402 in the direction of the first guard of the second part 402. The reduced outer diameter 412 is therefore shown as smaller than the maximum outer diameter 406 in FIG. 4a. Regarding FIG. 4b, there is shown the equivalent top view of the insert structure 400 in the first position and the insert structure 410 in the second position illustrated in FIG. 4a. The dimensional difference between the reduced outer diameter 412 and the maximum outer diameter 406 is further observable in FIG. 4b. The concentricity of the first and second through holes in the first position as well as their non-concentricity when the insert structure is in the second position is further evident in the top views presented in FIG. 4b as well as the abutment of the spring 420 on the anchors of the first part of the insert structure 400 arranged to secure said spring 420. As previously discussed in conjunction with FIG. 3b, the first and second through holes of the upper and second parts of the insert structure presented in the second position in FIG. 4b are shown evidently non-concentric.

Figure 5A:
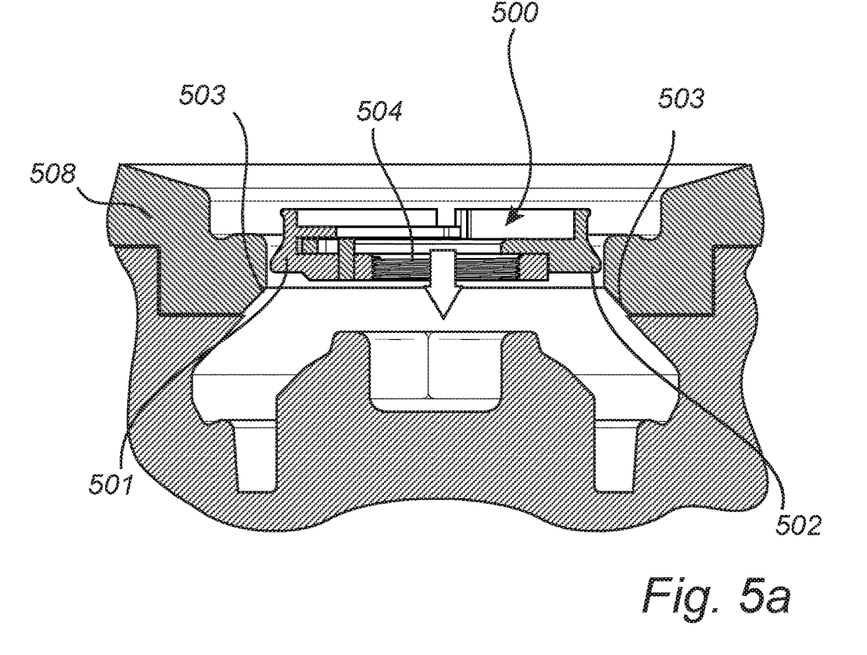
FIG. 5*a* illustrates the insert structure in a second position inserted in the wheel hub according to an embodiment.
Figure 5B:
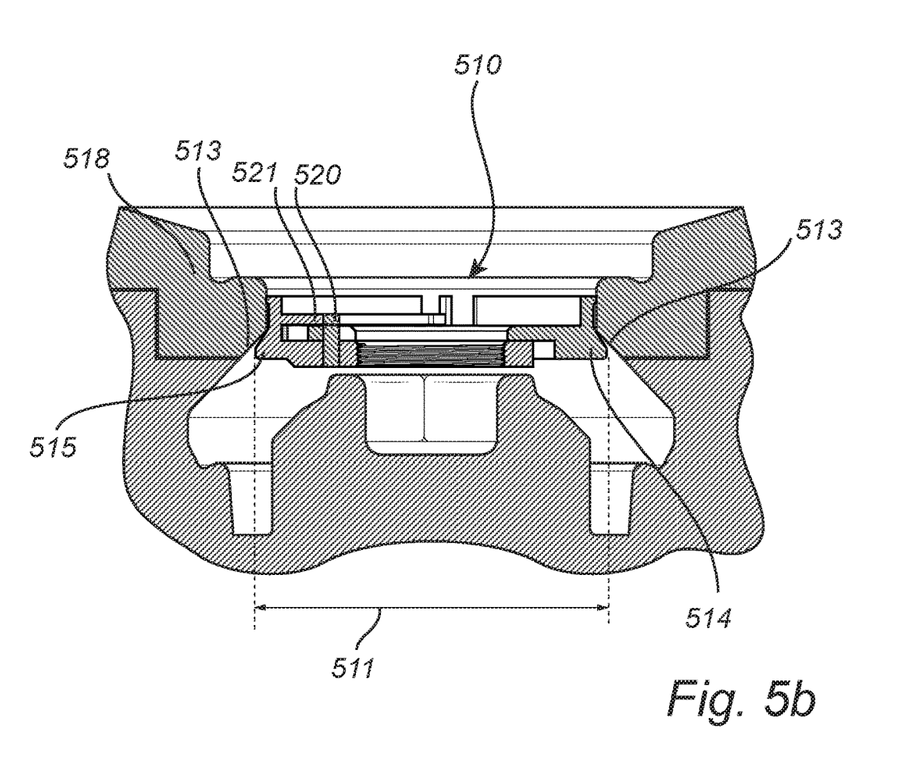
FIG. 5*b* illustrates the insert structure in a first position securely fixated in the wheel hub according to an embodiment.

FIG. 5a illustrates the insert structure in a second position inserted in the wheel hub according to an embodiment of the present invention. The insert structure 500 is shown in the second position well inserted in the wheel hub 508 and aligned with the axis of rotation of the wheel such that the second through hole of the second part 504 of the insert structure 500 may be concentric with said axis of rotation of the wheel. FIG. 5a further illustrates the first and second wedges 501, 502 being free of contact from the inner wall surfaces 503 of the wheel hub 508 as the outer diameter defined by the extremities of the first a second wedges 501, 502 reaches a minimum which is of a smaller dimension than the diameter of the wheel hub 508. The insert structure 500 in the second position shown in FIG. 4a may therefore be released from the wheel hub 508 if kept in said second position. Correspondingly, FIG. 5b illustrates the insert structure 510 in a first position securely fixed in the wheel hub 518 according to an embodiment of the present invention. The insert structure 510 in the first position is shown in FIG. 4b aligned with the axis of rotation of the wheel such that the first and second through holes of the upper and second parts of the insert structure 510 may be concentric together and with said axis of rotation of the wheel. FIG. 5b further illustrates the maximum outer diameter 511 reached by the insert structure 510 in the first position being significantly larger than the diameter 512 of the wheel hub 518 allowing the first and second wedges 514, 515 to enter in contact with and exert a force on the inner wall surfaces 513 of the wheel hub 518 resulting in a secure fixation of the insert structure 510 in the wheel hub 518 and resistance against forces applied on the insert structure 510 in the axial direction of the wheel of the vehicle. FIG. 5b further depicts the abutment of the stopper 520 inserted through the second part of the insert structure 510 with the bottom of the limiting recess 521 of the first part of the insert structure 510.

Figure 6:
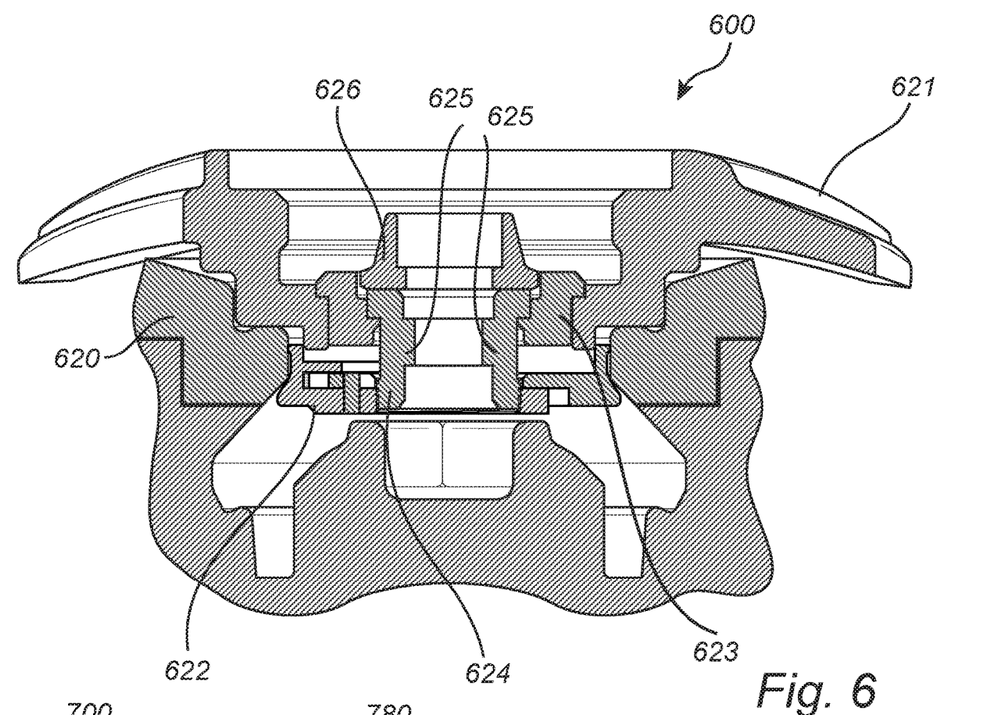
FIG. 6 illustrates a sectional view of a wheel of a vehicle in which components of the device are installed according to an embodiment.

FIG. 6 illustrates a sectional view of a wheel of a vehicle in which components of the device are installed according to an embodiment of the present invention. The insert structure 622 is shown in FIG. 6 in the first position and securely fixed in the wheel hub 620 such that its first and second wedges exert a force on the inner wall surfaces of said wheel hub 620. FIG. 6 further shows the center bolt 624 joined by corresponding threads to the second part of the insert structure 622 through the first and second through holes of said insert structure 622. The center bolt 624 is further shown inserted through the third through hole of the insert sleeve 623 which in turn securely engages the main module 621 via corresponding recesses and protrusions patterns described in FIG. 1. Therefore, the center bolt 624 securely attaches the main module 621 and the insert sleeve 623 to the insert structure 622 thus enabling the protective elements to limit or block access to the bolt heads and/or lug nuts of the wheel of the vehicle. FIG. 6 further depicts a locking cap 626 securely fixed to the insert sleeve 623 by engagement of the corresponding recesses and protrusions patterns, also described in FIG. 1, and superimposed over the center bolt 624 as to restrict or limit access to the center bolt 624 as well as to limit the rotation of said center bolt 624 which may result in its release from the insert structure 622. FIG. 6 further illustrates a locking protrusion 625 positioned on the inner wall of the hollow center of the center bolt 624 arranged to engage the components of the locking mechanism (not shown).

Figure 7:
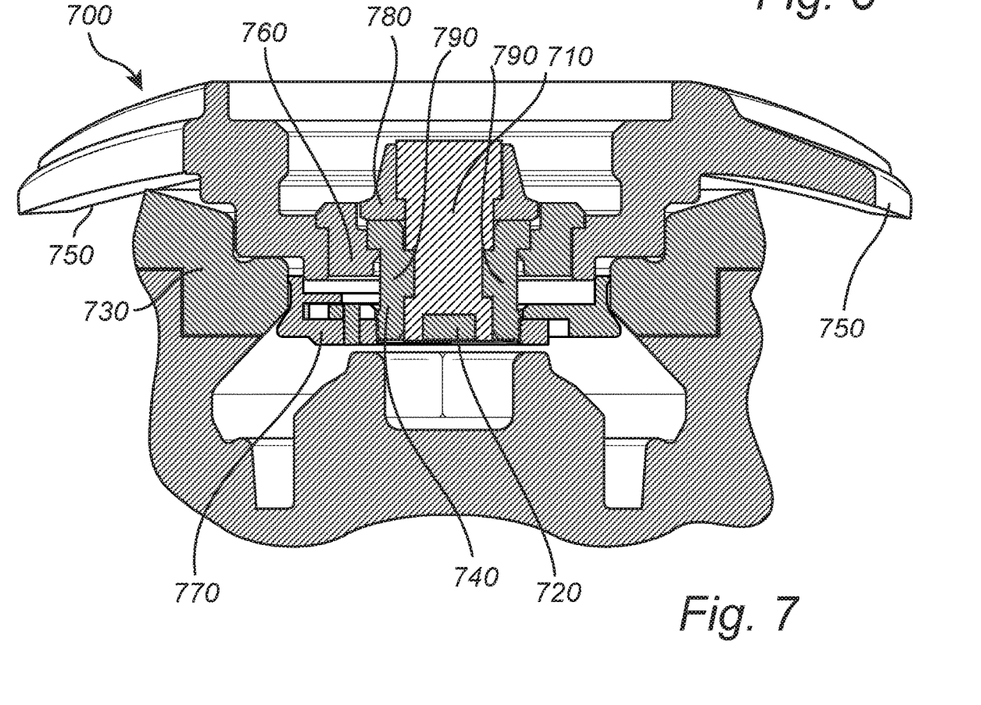
FIG. 7 illustrates a sectional view of a wheel of a vehicle in which the locking mechanism is installed in the wheel of the vehicle according to an embodiment.

FIG. 7 illustrates a sectional view of a wheel of a vehicle in which the locking mechanism is installed in the wheel of the vehicle according to an embodiment of the present invention. Similarly to the description of FIG. 7, FIG. 7 shows an insert structure 770 in the closed position and securely fixed in the wheel hub 730 such that its first and second wedges exert a force on the inner walls of said wheel hub 730 as well as a center bolt 740, an insert sleeve 760, a main module 700, protective elements 750 and a locking cap 780 according to the description of their homologous components of FIG. 7. FIG. 7 further illustrates a detachable locking bolt 710, comprising a key hole (not shown), inserted through the fourth through hole of the locking cap 780 into the center bolt 740. The detachable locking bolt 710 shown in FIG. 7 further comprises a locking recess 720 permitting such insertion of the detachable locking bolt 710 in the hollow center of center bolt 740 when said locking mechanism is in the open state. Therefore, upon rotation of the detachable locking bolt 710 i.e. upon transfer of the locking mechanism to the locking state, the locking recess 720 engages the locking protrusion 790 of the center bolt 740 restricting access or rotation of the components of the device of the present invention thus securely locking said device onto the wheel of the vehicle.

The device may be manufactured from various types of materials; however, aluminum and steel are the preferred materials.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A device for locking the wheel of a vehicle, comprising:
    a main module adapted to be attached to the wheel, and configured to cover nuts or bolts for attaching the wheel to the vehicle;
    an insert structure comprising a first part and a second part, wherein the first part engages the second part, wherein the insert structure is transferable from a first position to a second position upon compression of a spring having two opposite ends abutting anchors formed in the first part and positioned on an outer circumference of the first part facing the second part; and wherein the insert structure in said second position is adapted for insertion in the wheel concentrically to the axis of rotation of the wheel and wherein the insert structure in said first position is adapted for fixating the insert structure in said wheel upon transfer to the first position after insertion in the wheel;
    a center bolt adapted to be connected through the main module to the second part of the insert structure by threading; and
    a locking mechanism comprising at least a locking bolt, and being adapted to be arranged in a locking state in which the locking mechanism prevents the center bolt from rotating relative the main module, and in an open state in which the locking mechanism allows the center bolt to rotate relative the main module.

2. The device according to claim 1, wherein the first part comprises an inferior surface and the second part comprises a superior surface arranged such that the inferior surface is in constant contact with the superior surface.

3. The device according to claim 1, wherein the first part and the second part of the insert structure comprise a first through hole and a second through hole respectively and wherein the first and second through holes are adapted to receive the center bolt.

4. The device according to claim 1, wherein the second part comprises a first guard and the first part comprises a second guard such that the first guard at least partially surrounds the first part and the second guard at least partially surrounds the second part when the insert structure is in the second position.

5. The device according to claim 4, wherein the first guard comprises a central protrusion forming a channel with a superior surface of the second part of the insert structure wherein the first part of the insert structure completely engages the channel when in the second position and partially engages the channel when in the first position.

6. The device according to claim 5, wherein the spring is arranged to be positioned in the channel and exert opposing forces on the second part and on the first part such that the insert structure is normally in the first position.

7. The device according to claim 6, wherein the spring represents a leaf spring comprising an arc-shaped length and at least two legs wherein the arc-shaped length is arranged to abut the first guard of the second part and the at least two legs are arranged to abut the first part.

8. The device according to claim 1, wherein the insert structure comprises a stopper inserted through the second part and the first part and configured to limit the movement of the first part relative to the second part such that the first and second through holes are concentric when in the first position.

9. The device according to claim 1, wherein the first part of the insert structure and the second part of the insert structure comprise a first wedge and a second wedge respectively.

10. The device according to claim 9, wherein the first wedge and the second wedge are arranged on opposite sides of the diameters of the first through hole and the second through hole of the upper and second parts of the insert structure.

11. The device according to claim 9, wherein the first wedge and the second wedge determine an outer diameter of the insert structure and wherein said outer diameter decreases when the insert structure transfers to the second position.

12. The device according to claim 9, wherein the first wedge and the second wedge are configured to secure the insert structure by engaging the wheel of the vehicle when the insert structure is in the first position and to release the wheel of the vehicle when the insert structure is in the second position.

13. The device according to claim 1, wherein opposing forces are applied to the first part and to the second part towards the center of the insert structure to transfer from the first position to the second position and released to transfer from the second position to the first position.

14. The device according to claim 13, wherein the first part of the insert structure is configured to translate towards the second part of the insert structure in a direction parallel to a plane formed by the contacting inferior surface and superior surface when transferring from the first position to the second position and to translate away from the second part of the insert structure in a direction parallel to a plane formed by the contacting inferior surface and superior surface when transferring from the second position to the first position.

15. The device according to claim 1, wherein the locking mechanism comprises:
- a locking protrusion formed in the center bolt;
- an insert sleeve having a third through hole and being adapted to be rotationally secured to the main module; and
- a detachable locking bolt adapted to be inserted into the main module via the third through hole and the locking protrusion;
- wherein the locking protrusion and the third through hole are configured to be aligned with each other; and
- the detachable locking bolt is adapted to prevent the center bolt from rotating relative the insert structure.

* * * * *